United States Patent [19]

Thompson et al.

[11] Patent Number: 4,477,050
[45] Date of Patent: Oct. 16, 1984

[54] MULTI-DIRECTIONAL VIBRATION ATTENUATOR SEAT

[75] Inventors: James E. Thompson; Leonard E. Sandvik, both of Cedar Falls; Marc A. Elliott, Muscatine, all of Iowa

[73] Assignee: Deere & Company, Moline, Ill.

[21] Appl. No.: 219,900

[22] Filed: Dec. 24, 1980

[51] Int. Cl.³ .......................................... F16M 13/00
[52] U.S. Cl. .................... 248/636; 248/415; 248/425
[58] Field of Search ............. 248/636, 430, 419, 603, 248/425, 424, 415, 562, 565, 569, 570, 581, DIG. 13, 657; 297/346; 33/1 A

[56] References Cited

U.S. PATENT DOCUMENTS

| | | | |
|---|---|---|---|
| 1,285,628 | 11/1918 | Craley | 248/657 |
| 1,435,763 | 11/1922 | Townsend | 248/603 X |
| 1,938,799 | 12/1933 | Bourne | 248/603 X |
| 2,932,342 | 4/1960 | Simons et al. | 155/14 |
| 3,100,617 | 8/1963 | Radke et al. | 248/430 |
| 3,134,568 | 5/1964 | Carson | 248/425 |
| 3,137,472 | 6/1964 | Louton et al. | 248/419 X |
| 3,190,592 | 6/1965 | Grizzle, Jr. | 248/20 |
| 3,258,241 | 6/1966 | Oswald | 248/430 |
| 3,335,996 | 8/1967 | Hall et al. | 248/400 |
| 3,516,628 | 6/1970 | Kendall | 248/636 |
| 3,685,780 | 8/1972 | Stannebein | 248/430 X |
| 3,917,210 | 11/1975 | Miller | 248/419 |
| 3,999,800 | 12/1976 | Penzotti | 297/345 |
| 4,005,845 | 2/1977 | Luppi et al. | 297/346 X |
| 4,008,917 | 2/1977 | Sigwarth et al. | 248/636 |
| 4,195,883 | 4/1980 | Ronnhult et al. | 297/302 |
| 4,228,984 | 10/1980 | Thompson et al. | 248/636 |
| 4,233,740 | 11/1980 | Bunn et al. | 33/1 A |

Primary Examiner—William H. Schultz
Assistant Examiner—Ramon O. Ramirez
Attorney, Agent, or Firm—Fraser and Bogucki

[57] ABSTRACT

A multi-directional vibration attenuator seat is capable of limited, restrained movement in any direction within a generally horizontal plane in response to vibration and other motions of the seat and the vehicle in which the seat is mounted. The limited movement is made possible by a seat arrangement in which an intermediate assembly is disposed on top of and slidable relative to a base assembly along a first axis with a seat supporting upper assembly being disposed on and slidable relative to the intermediate assembly along a second axis extending in a direction generally perpendicular to the direction of the first axis. The seat is normally maintained in and is restrained from movement out of a nominal position relative to the base assembly by a plurality of springs. A pair of shock absorbers disposed generally perpendicular to each other damp movement of the seat along the first and second axes respectively.

An adjuster latch and lever arrangement is used to position the base assembly at a selected location along a pair of slidable adjusters on which the base assembly is mounted. Attenuating movement of the seat can be locked out by a manually controlled lever which drops a pin through an aperture in the base assembly from the upper assembly to lock the various assemblies together. The seat is preferably mounted for rotation about the upper assembly, which rotation can be locked out by a swivel lock lever and toothed plate arrangement.

23 Claims, 13 Drawing Figures

MULTI-DIRECTIONAL VIBRATION ATTENUATOR SEAT

BACKGROUND OF THE INVENTION

1. Field of the Invention

The present invention relates to seats for tractors and other off-road vehicles which encounter substantial amounts of vibration and other motion, and more particularly to seats for such vehicles which are capable of undergoing attenuating movement in response to the vibration and other motion.

2. History of the Prior Art

Off-road vehicles such as agricultural tractors and similar vehicles subject the rider to a substantial amount of vibration and other motion due to the nature of the vehicle itself and particularly to the roughness and unevenness of terrain typically negotiated by such vehicles. Consequently, it is common to provide the seats in such vehicles with the ability to undergo limited attenuating movement in one or more directions to compensate for such vibrations and other motion. Many early tractor seats, for example, were constructed so as to be capable of undergoing some vertical movement. This movement was typically controlled using damping pistons and similar apparatus. Later tractor seats came to be provided with attenuating horizontal movement in addition to or in lieu of attenuating vertical movement.

An example of a seat for use with tractors and similar off-road vehicles which is capable of attenuating movement in a generally horizontal direction is provided by a co-pending application Ser. No. 960,125, filed Nov. 13, 1978 and assigned to the assignee of the present application. The seat described in that patent application is capable of attenuating fore-aft motion by an underseat arrangement which includes a plurality of bearings slidable along parallel bars. The seat is retained in a nominal position by an opposing pair of springs, and motion of the seat is damped by a piston.

Further examples of prior art seat arrangements which provide attenuating fore-aft movement are provided by U.S. Pat. No. 3,258,241 of Oswald, U.S. Pat. No. 3,100,617 of Radke et al. and U.S. Pat. No. 2,932,342 of Simons et al. Shock absorption of seat movement in the fore-aft direction is described in U.S. Pat. No. 3,190,592 of Grizzle, Jr. and U.S. Pat. No. 3,100,618 of Tengler et al.

Still other examples of prior art seat arrangements permitting limited our attenuating movement are provided by U.S. Pat. Nos. 3,245,486 of Oswald, 3,335,996 of Hall et al, 3,061,260 of Simons et al, 3,999,800 of Penzotti, 4,099,777 of Chekirda, 3,917,210 of Miller, 4,195,883 of Ronnhult et al, 4,128,217 of Mazelsky, French Pat. No. 742,189 of Fricard and British Patent Specification No. 1,303,936 ofNystrom.

The prior art seat arrangements previously described typically limit attenuating movement in a horizontal plane or direction to a single axis or direction of movement. Based on the types of motion typically encountered by the vehicle the direction may be fore-aft or lateral. As a practical matter the vibrations and other motions encountered occur in all directions, even though they may be more severe in one direction such as fore-aft than in an opposite direction.

It would therefore be desirable to provide a seat capable of undergoing attenuating movement along more than one axis within a generally horizontal plane. Ideally, the seat should be capable of attenuating movement in any and all directions within a generally horizontal plane.

BRIEF DESCRIPTION OF THE INVENTION

The above and other objects are accomplished in accordance with the inventionby a seat capable of limited, attenuating movement along more than one axis within a generally horizontal plane. Seats in accordance with the invention are constructed to permit attenuated movement in any direction within a generally horizontal plane.

The multi-directional vibration attenuator seats in accordance with the invention include a base assembly mounted on the vehicle such as by a pair of slidable seat adjusters and a seat assembly which includes a rotatable seat. The seat assembly is coupled to the base assembly by unique arrangements which permit attenuating movement of the seat assembly and its included seat relative to the base assembly in any direction within a generally horizontal plane. Except when subjected to vibration and other motions, the seat is maintained in a nominal center position relative to the base assembly, and may be locked in this position if desired so as to prevent attenuating movement. The base assembly which is slidable in the fore-aft direction via the slidable adjusters is normally locked in a desired position relative to the adjusters. The seat may remain free to rotate where desired, or the rotation can be locked out.

Attenuating movement of the seat assembly relative to the base assembly in all directions within a horizontal plane is provided by an intermediate assembly sandwiched between the base assembly and the seat assembly. The intermediate assembly is coupled to the base assembly so as to be capable of undergoing relative movement along a first axis. At the same time the seat assembly is coupled to the intermediate assembly so as to be capable of undergoing relative movement along a second axis which extends in a direction perpendicular to the direction of the first axis. In this way the seat assembly is capable of undergoing movement in any direction relative to the base assembly.

In a preferred embodiment of a multi-directional vibration attenuator seat in accordance with the invention the base assembly is comprised of a base plate mounted on a pair of slidable adjusters. The inermediate assembly comprises a bearing retainer plate having apertures therein for receiving bearing clusters which engage the base plate to permit sliding movement of the bearing retainer plate relative to the base plate. A first pair of slots in the bearing retainer plate extending in the direction of the first axis receive rollers therein which are rotatably mounted on the base plate to permit movement of the bearing retainer plate relative to the base plate along the first axis. A second pair of slots in the bearing retainer plate which extend in the direction of the second axis receive rollers rotatably mounted on the underside of a lower bearing plate which engages the bearing clusters in the bearing retainer plate, to permit movement of the lower bearing plate relative to the bearing retainer plate in the direction of the second axis. The lower bearing plate forms the lower end of the seat assembly which also includes a swivel disk mounted on the lower bearing plate for rotatably supporting a seat mounting plate to which the seat itself is coupled. A collar mounted on the lower bearing plate extends through central apertures in the swivel disk, the seat mounting plate and a lower bearing disk on top of the seat mounting plate to keep the arrangement concentric. A bearing retainer disk containing bearings therein is sandwiched between the lower bearing disk and an upper bearing disk to facilitate rotation of the seat mounting plate and the attached seat relative to the swivel disk and the attached lower bearing plate.

The seat mounting plate is normally held in a nominal center position relative to the base plate by a plurality of springs coupled between a spider member attached to the top of a stud emanating from the base plate and selected portions of the seat mounting plate. The springs resiliently resist movement of the seat mounting plate out of the nominal center position. Movement of the seat mounting plate out of the nominal center position is damped by a pair of shock absorbers disposed generally perpendicularly to each other and coupled between the spider member and different portions of the seat mounting plate.

The base plate is locked in a selected fore-aft position relative to the slidable adjusters by a manually actuable adjuster lever pivotally coupled to the underside of the bearing retainer plate and engaging an adjuster latch. The adjuster latch which is pivotally coupled to the underside of the base plate adjacent an edge thereof is normally urged by a spring into a position in which integral teeth thereof engage apertures in the side of an adjacent one of the slidable adjusters. Manual swiveling of the adjuster lever pivots the adjuster latch so as to temporarily remove the teeth from the apertures in the slidable adjuster so that the base plate may be repositioned relative to the slidable adjusters.

Attenuating movement of the seat can be locked out by an arrangement which includes a vertically movable pin mounted on the lower bearing plate. Downward movement of the pin with the seat in the nominal center position forces the pin through an aperture in the base plate to effectively lock the lower bearing plate and the bearing retainer plate to the base plate. Upward movement of the pin removes the pin from the aperture in the base plate, thereby freeing the seat to undergo attenuating movement. Vertical movement of the pin is controlled by an attenuator lock plate pivotally mounted on the underside of the seat mounting plate and engaging a roller at the top end of the pin. Pivotal movement of the attenuator lock plate is in turn controlled by an attenuator lock lever pivotally coupled to the underside of the seat mounting plate and capable of pivoting the attenuator lock plate by camming engagement therewith.

Rotation of the seat may be locked out by an arrangement which includes a swivel lock lever pivotally mounted on the underside of the seat mounting plate and normally biased by a spring into either of opposite positions. In one of the opposite positions the swivel lock lever engages one of a plurality of teeth in the outer periphery of the lower bearing plate so as to lock out swiveling of the seat. In the other one of the opposite positions the swivel lock lever is disposed away from the lower bearing plate, permitting the seat to rotate freely.

In an alternative embodiment of a multi-directional vibration attenuator seat in accordance with the invention, the intermediate assembly comprises a generally planar member having a first plurality of rollers rotatably mounted therein along a first plurality of generally parallel axes. The first plurality of rollers engage the base assembly, permitting the intermediate assembly to move relative to the base assembly along a first axis. The intermediate assembly also includes a second plurality of rollers mounted for rotation about a second plurality of generally parallel axes which extend in directions perpendicular to the directions of the first plurality of axes. The second plurality of rollers engage the underside of a seat support at the bottom of the seat assembly in such a way that the seat support can undergo motion relative to the intermediate assembly along a second axis extending in a direction perpendicular to the direction of the first axis. The seat itself is rotatably mounted on the seat support.

A first pair of springs coupled between a common location on the base assembly and opposite locations on the intermediate assembly tend to maintain the intermediate assembly in a nominal center position relative to the base assembly. Movement of the intermediate assembly relative to the base assembly is damped by a first shock absorber coupled between the intermediate assembly and the base assembly. Both the first pair of springs and the first piston extend in directions generally parallel to the direction of the first axis. The intermediate assembly also includes a second pair of springs and a second shock absorber, both of which extend in directions generally parallel to the direction of the second axis. The second pair of springs are coupled between a common location on the seat support and opposite locations on the intermediate assembly to urge the seat support into a nominal center position relative to the intermediate assembly. The second shock absorber which is coupled between the seat support and the intermediate assembly damps movement of the seat relative to the intermediate assembly along the second axis.

BRIEF DESCRIPTION OF THE DRAWINGS

The foregoing and other objects, features and advantages of the invention will be apparent from the following more particular description of preferred embodiments of the invention, as illustrated in the accompanying drawings, in which.

DETAILED DESCRIPTION

Figure 1:
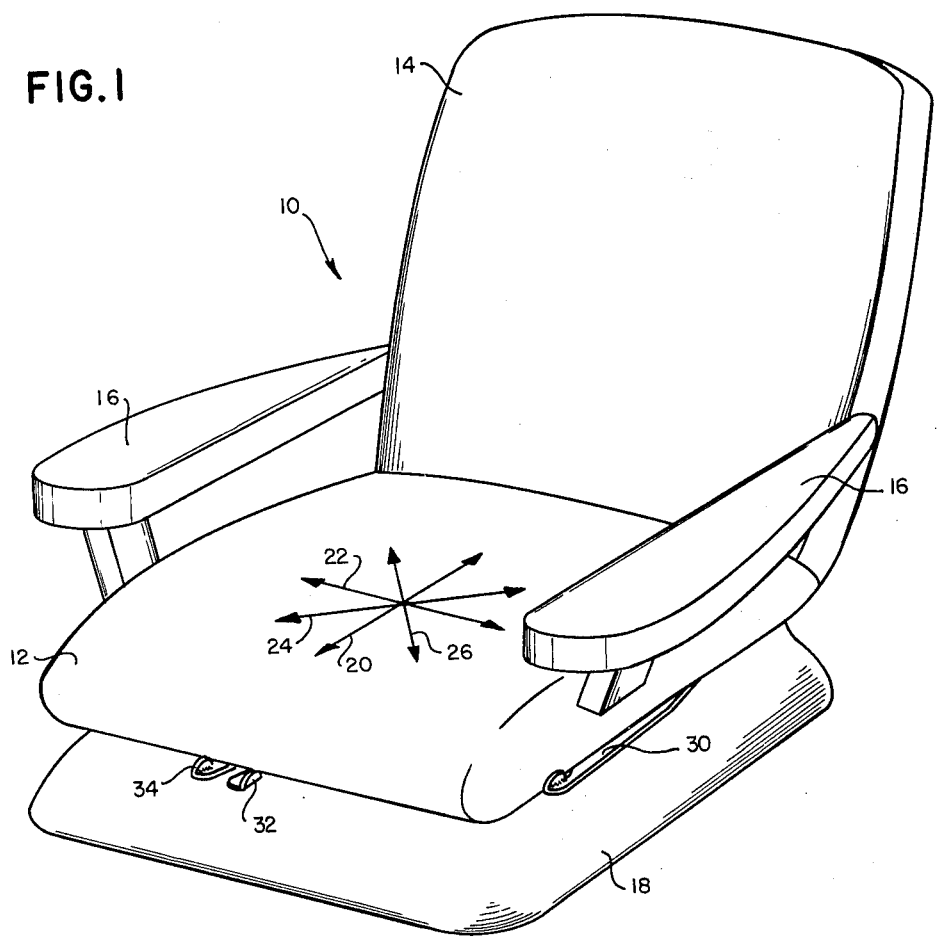
FIG. 1 is a perspective view of a multi-directional vibration attenuator seat in accordance with the invention.

FIG. 1 depicts a multi-directional vibration attenuator seat 10 in accordance with the invention. The seat 10 includes a seat cushion 12 supporting at the rear thereof a backrest 14. The seat cushion 12 and the backrest 14 together support an opposite pair of armrests 16. The seat cushion 12, the backrest 14 and the armrests 16 are of conventional design.

In accordance with the invention, the seat 10 is capable of attenuating movement in any direction in a generally horizontal plane relative to a support 18 for the seat 10. Thus, the seat 10 is capable of attenuating movement in the fore-aft direction as illustrated by a double headed arrow 20. At the same time the seat 10 is also capable of attenuating lateral movement as illustrated by a double headed arrow 22. In addition the seat 10 can move in any other direction between the arrows 20 and 22 as represented, for example, by additional double headed arrows 24 and 26. The various double headed arrows 20, 22, 24 and 26 are shown by way of example only, and it is again emphasized that the seat 10 is capable of attenuating movement from a nominal center position in any direction within a generally horizontal plane in response to vibration or other motions.

The seat 10 is provided with three different manually operated controls comprising an adjuster lever 30, a swivel lock lever 32 and an attenuator lock lever 34. As described hereafter the seat 10 is mounted on a pair of slidable adjusters. Outward movement of the adjuster lever 30 uncouples the seat 10 from the slidable adjusters enabling the fore-aft position of the seat 10 relative to the support 18 to be adjusted. When the desired fore-aft position of the seat 10 is reached, the adjuster lever 30 is released so as to lock the seat in the desired fore-aft position. The swivel lock lever 32 may be used to lock out rotation of the seat 10. With the lever 32 in one position, the seat 10 is free to rotate or swivel relative to the support 18. When the swivel lock lever 32 is moved into an opposite position the seat 10 is locked into a given angular position and cannot be rotated. With the attenuator lock lever 34 in one position the seat 10 is free to undergo attenuating movement in any direction as represented by the double headed arrows 20, 22, 24 and 26. With the seat 10 in the nominal center position, the attenuator lock lever 34 may be moved into an opposite position to lock out attenuating movement of the seat 10.

The supporting apparatus which is disposed under the seat cushion 12 and thereby hidden from view in FIG. 1 and which permits both swiveling of the seat 10 and attenuating movement in any direction is shown in detail in FIGS. 2–12 in a preferred embodiment thereof. The various parts of the seat 10 and the relationships therebetween are depicted in the various figures, but are perhaps best illustrated in the exploded view of FIG. 2.

Referring to FIGS. 2–12, the seat 10 includes a pair of slidable adjusters 40 and 42 which are mounted in generally parallel, spaced-apart relation on a supporting structure for the seat 10 such as the support 18 shown in FIG. 1. The adjusters 40 and 42 are of conventional design, with each comprising an elongated lower track 44 for mounting on the support 18 and an upper hollow housing 46 which partially surrounds and which is slidable on the lower track 44. A portion of an outer edge of the upper hollow housing 46 in the slidable adjuster 40 is cut away so as to reveal two of a plurality of spaced-apart apertures 48 along the outer edge of the lower track 44. As described hereafter in greater detail the adjuster lever 30 controls the position of an adjuster latch 52 such that a pair of teeth 54 on the adjuster latch 52 engage two of the apertures 48 to lock the seat 10 in a desired fore-aft position on the lower track 44. This causes a base plate 60 which is fastened to the upper hollow housing 46 of the slidable adjusters 40 and 42 to assume a desired fore-aft position.

The base plate 60 and the slidable adjusters 40 and 42 together form a base assembly 62 for the seat 10. After adjustment of the slidable adjusters 40 and 42, the base plate 60 remains locked to the support 18 via the adjusters 40 and 42 in a desired fore-aft position. Thereafter, the remaining components of the seat 10 may undergo movement relative to the base plate 60 to attenuate vibration and other motions to which the seat 10 may be subjected.

Figure 2:
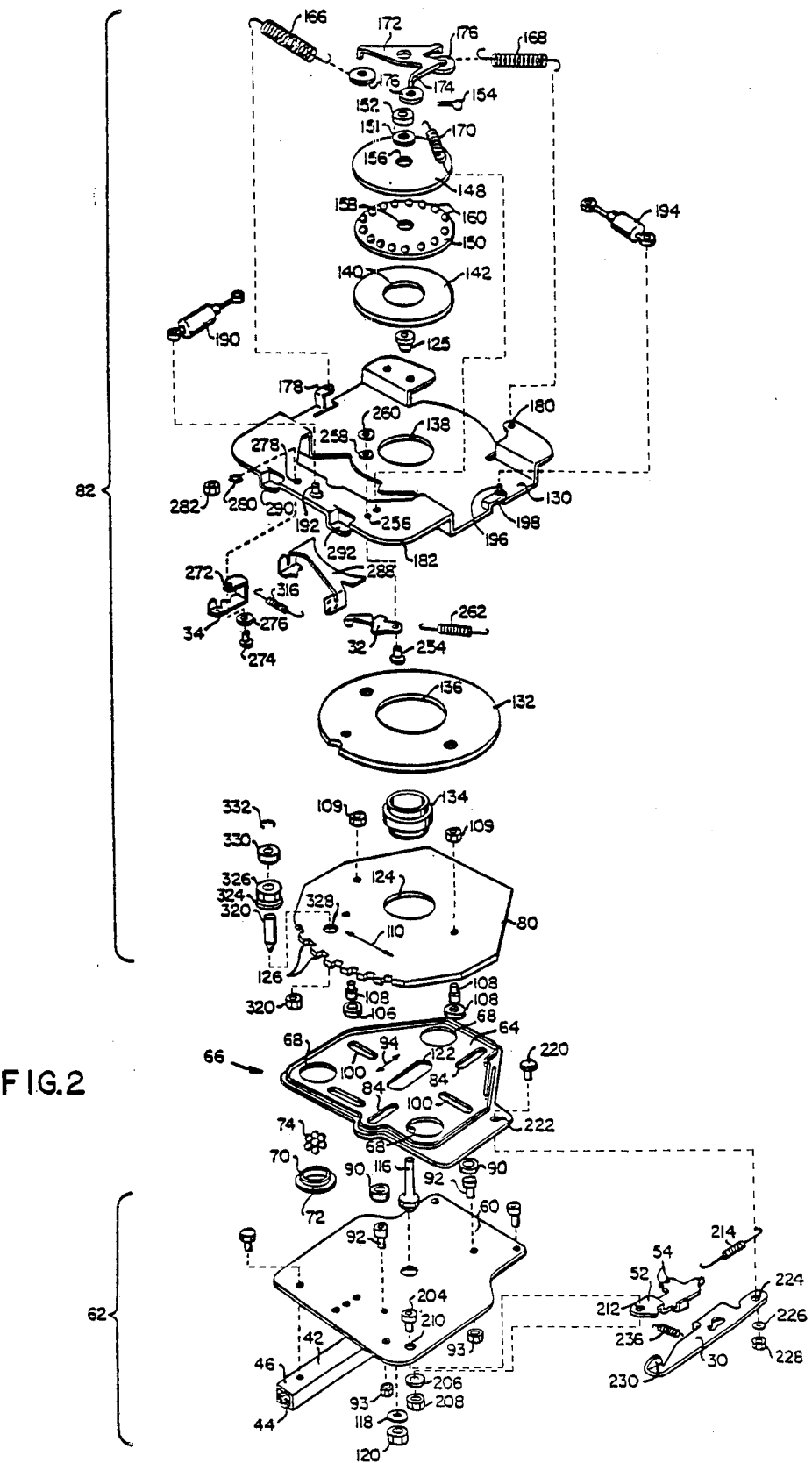
FIG. 2 is a perspective, exploded view of the seat of FIG. 1 with the seat cushion, backrest and armrests removed for clarity of illustration.
Figure 3:
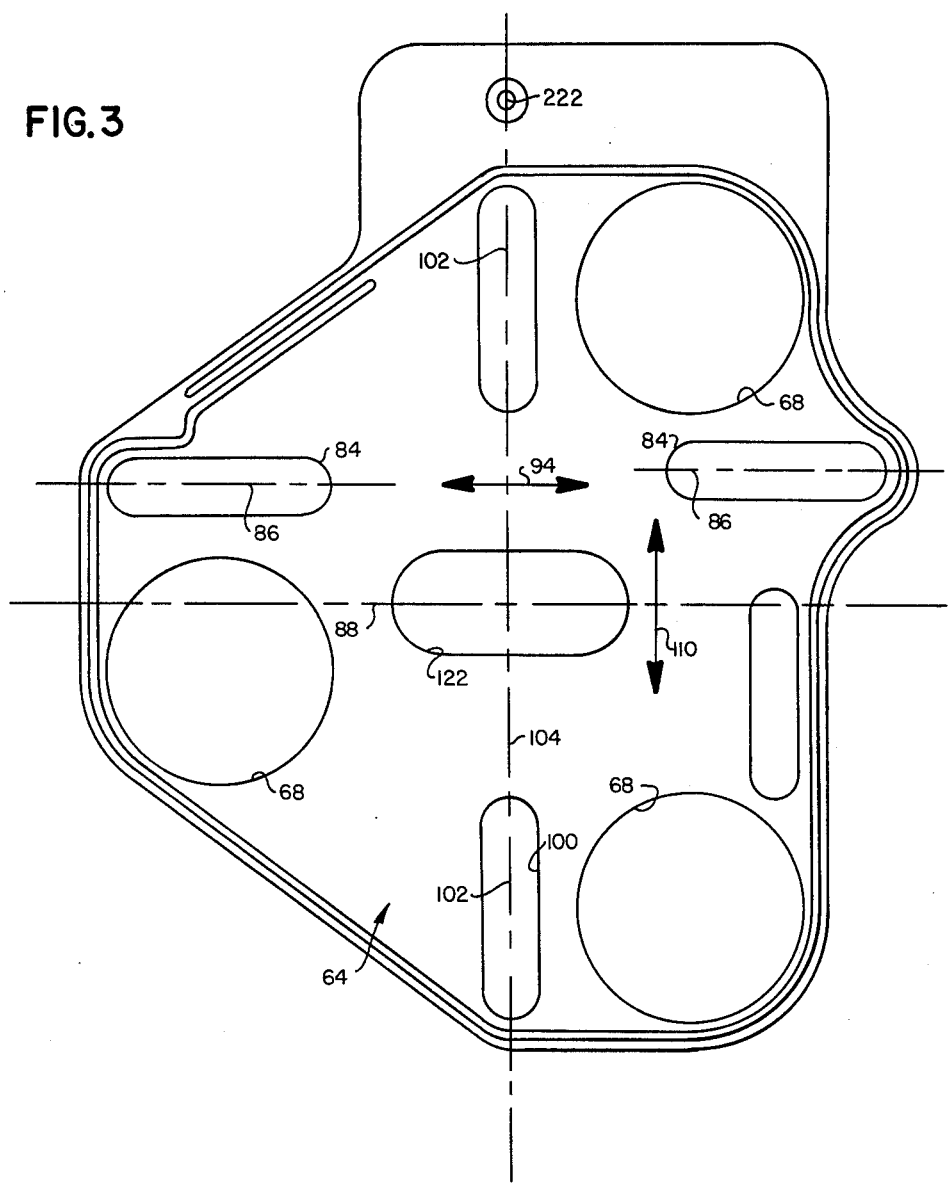
FIG. 3 is a top, plan view of the bearing retainer plate in the arrangement of FIG. 2.
Figure 7:
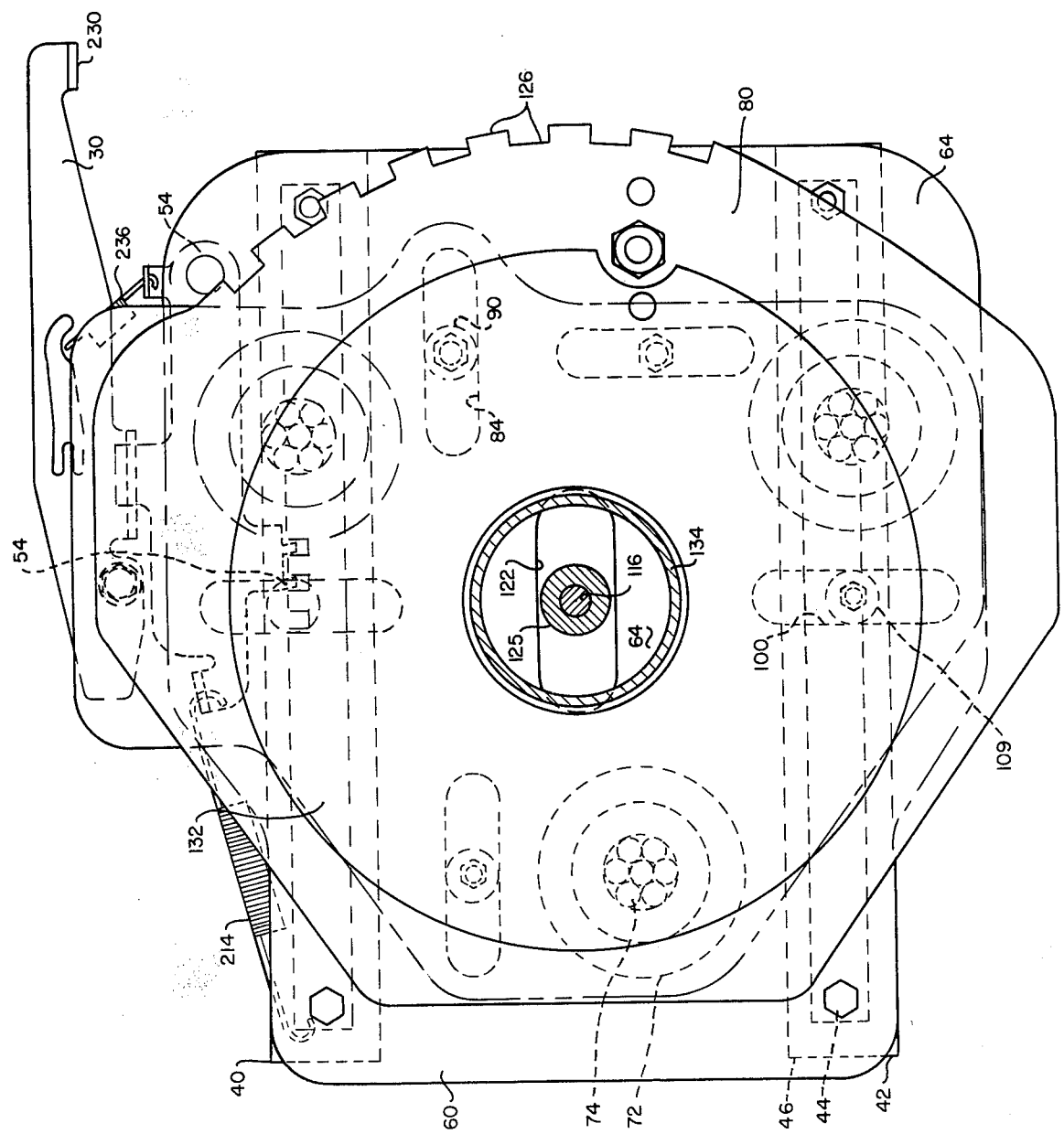
FIG. 7 is a sectional view taken along the line 7—7 of FIG. 5.

Mounted on top of the base plate 60 is a bearing retainer plate 64 which is shown in detail in FIG. 3 and which comprises an intermediate assembly 66 of the seat 10. The bearing retainer plate 64 has three different circular apertures 68 therein for receiving three different bearing clusters 70. As shown in FIG. 7 as well as in FIG. 2 each bearing cluster 70 is comprised of a felt seal 72 mounted within the aperture 68 and a plurality of bearing balls 74 disposed within the felt seal 72. With the bearing clusters 70 mounted in place within the apertures 68, the balls 74 contact the upper surface of the base plate 60 and the lower surface of a lower bearing plate 80 disposed above the bearing retainer plate 64. The lower bearing plate 80 comprises the bottom of a seat assembly 82 which includes the seat cushion 12, the backrest 14 and the armrests 16 shown in FIG. 1.

The bearing clusters 70 permit the bearing retainer plate 64 to move relative to the base plate 60 and the lower bearing plate 80 to move relative to the bearing retainer plate 64. These relative movements are confined to predetermined axes by an arrangement of elongated slots and mating rollers. The bearing retainer plate 64 is provided with a first pair of elongated slots 84 disposed therein at the front and rear portions of the plate 64. As shown in FIG. 3 the slots 84 have axes of elongation 86 which are parallel to a first axis 88 extending through the bearing retainer plate 64 in the fore-aft direction. The elongated slots 84 receive a pair of rollers 90 which are rotatably mounted on the upper surface of the base plate 60 by a pair of pins 92 secured to the plate 60 by locking nuts 93. Each of the rollers 90 resides within a different one of the elongated slots 84 with a sliding fit so as to permit sliding motion of the slot 84 relative to the roller 90 contained therein. This permits the bearing retainer plate 64 to undergo sliding movement relative to the base plate 60 in the fore-aft direction shown by a double headed arrow 94 which is parallel to the direction of the first axis 88. The balls 74 within the bearing clusters 70 roll on the top surface of the base plate 60 to facilitate the sliding movement. In this manner the intermediate assembly 66 comprised of the bearing retainer plate 64 is able to undergo movement relative to the base assembly 62 comprised of the base plate 60 and the slidable adjusters 40 and 42 along the first axis 88.

The bearing retainer plate 64 is also provided with a second pair of elongated slots 100 located at the opposite sides of the bearing retainer plate 64. The elongated slots 100 have axes of elongation 102 which lie along a second axis 104. The second axis 104 is perpendicular to the first axis 88 and extends in the lateral direction of the seat 10. A pair of rollers 106 rotatably mounted at the underside of the lower bearing plate 80 by a pair of pins 108 secured to the plate 80 by locking nuts 109 are received within the opposite elongated slots 100, thereby permitting the lower bearing plate 80 to undergo sliding movement relative to the bearing retainer plate 64 in opposite directions along the second axis 104 as represented by a double headed arrow 110. The balls 74 of the various bearing clusters 70 contact the lower surface of the lower bearing plate 80 to facilitate the relative sliding movement. The rollers 106 move along the lengths of the slots 100 in a sliding relationship to insure that the relative movement is linear and along the second axis 104. In this manner the seat assembly 82 which terminates in the lower bearing plate 80 at the bottom thereof is capable of undergoing linear movement relative to the bearing retainer plate 64 comprising the intermediate assembly 66.

A stud 116 is mounted at the center of the base plate 60 by a lock washer 118 and a jam nut 120. The stud 116 extends upwardly in a generally vertical direction from the base plate 60 so as to extend through an elongated aperture 122 in the bearing retainer plate 64 and a circular aperture 124 at the center of the lower bearing plate 80. The stud 116 is provided with a rubber bushing 125 above the base plate 60. The apertures 122 and 124 are of appropriate size and shape to permit a desired amount of attenuating movement between the base plate 60, the bearing retainer plate 64 and the lower bearing plate 80. A portion of the outer edge of the lower bearing plate 80 is provided with a plurality of teeth 126. The teeth 126 are used to lock out rotation of the seat as described hereafter.

The seat cushion 12 shown in FIG. 1 is mounted to a seat mounting plate 130 together with the backrest 14 and the armrests 16. Rotation of the seat is provided for by making the seat mounting plate 130 rotatable relative to the lower bearing plate 80. This is provided for in part by a swivel disk 132 which is mounted on top of the lower bearing plate 80 and which is made of plastic or other low friction material to facilitate sliding of the seat mounting plate 130 thereon. At the same time the seat mounting plate 130, the swivel disk 132 and the lower bearing plate 80 are maintained in a concentric relationship by a collar 134. The collar 134 which is mounted within the circular central aperture 124 in the lower bearing plate 80 extends through a central circular aperture 136 of slightly larger size in the swivel disk 132 and through a central circular aperture 138 of slightly larger size in the seat mounting plate 130. The upper end of the collar 134 terminates in a central circular aperture 140 in a lower bearing disk 142 disposed on top of the seat mounting plate 130. If attenuating movement of the seat assembly 82 is large enough, the collar 134 strikes the rubber bushing 125 mounted on the stud 116.

In order to hold the seat assembly 82, the intermediate assembly 66 and the base assembly 62 together, it is necessary to limit the upward movement of the seat mounting plate 130 relative to the base plate 60. This is accomplished by an upper bearing disk 148 and a bearing retainer disk 150 mounted on the upper end of the stud 116 and secured thereon by a spring washer 151, a slotted nut 152 and a cotter pin 154. The upper bearing disk 148 has a central aperture 156 therein large enough to accommodate the stud 116. The bearing retainer disk 150 also has a central aperture 158 therein large enough to accommodate the stud 116. The bearing retainer disk 150 has a plurality of bearing balls 160 rotatably mounted therein around the outer periphery thereof so as to contact both the underside of the upper bearing disk 148 and the upper surface of the lower bearing disk 142. As the bearing retainer plate 64 and the lower bearing plate 80 undergo movement relative to each other and relative to the base plate 60, the collar 134 is pulled out of a concentric relationship relative to the stud 116 so as to move about the stud 116 during each motion. The swivel disk 132, the seat mounting plate 130 and the lower bearing disk 142 which are journaled about the collar 134 undergo similar motion relative to the stud 116 while the upper bearing disk 148 remains concentrically mounted on the upper end of the stud 116. This relative movement is permitted by the bearing balls 160 which roll over the upper surface of the lower bearing disk 142 as the disk 142 undergoes movement relative to the bearing retainer disk 150 and the upper bearing disk 148.

The seat 10 is normally maintained in a nominal center position by positioning the seat mounting plate 130 so that the stud 116 is at the center of the circular aperture 138 within the seat mounting plate 130. This is accomplished by three different springs 166, 168 and 170 which are generally equidistantly spaced around the stud 116 and which are coupled between the stud 116 and different portions of the seat mounting plate 130. The springs 166, 168 and 170 are coupled to the stud 116 by a spider member 172 having three different fingers 174 extending therefrom. Each of the fingers 174 terminates in a roller 176 about which one end of the associated springs 166, 168 or 170 is curled. The opposite end of the spring 166 is attached to the seat mounting plate 130 at a raised tab 178 thereof at the righthand edge of the seat mounting plate 130. The opposite end of the spring 168 is attached to the seat mounting plate 130 at a large raised tab 180 at the left rear corner of the seat mounting plate 130. The opposite end of the spring 170 is coupled to a raised platform 182 extending across the front end of the seat mounting plate 130. In the absence of forces on the seat 10, the springs 166, 168 and 170 maintain the stud 116 within the center of the circular aperture 138 to hold the seat 10 in the nominal center position. When forces are applied to the seat 10 so as to cause relative movement between the lower bearing plate 80, the bearing retainer plate 64 and the base plate 60, the springs 166, 168 and 170 permit such movement while at the same time providing a desired amount of resistance thereto.

Damping of movement of the seat 10 and the included seat mounting plate 130 relative to the base plate 60 and the stud 116 is provided by a pair of shock absorbers. A fore-aft shock absorber 190 has one end thereof mounted on the top of the stud 116 and an opposite end mounted on a pin 192 extending upwardly from the raised platform 182 at the front of the seat mounting plate 130. The fore-aft shock absorber 190 extends in a direction parallel to the direction of the first axis 88 so as to damp motion of the bearing retainer plate 64 relative to the base plate 60. A second or lateral shock absorber 194 disposed generally perpendicular to the fore-aft shock absorber 190 has one end thereof coupled to the spider member 172 and an opposite end mounted on a pin 196 which extends upwardly from a raised tab 198 at the left side of the seat mounting plate 130. The lateral shock absorber 194 damps movement of the lower bearing plate 80 and the included seat mounting plate 130 relative to the bearing retainer plate 64.

Figure 9:
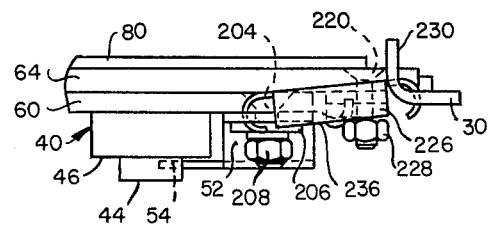
FIG. 9 is a front view of a portion of the arrangement shown in FIG. 7.
Figure 10:
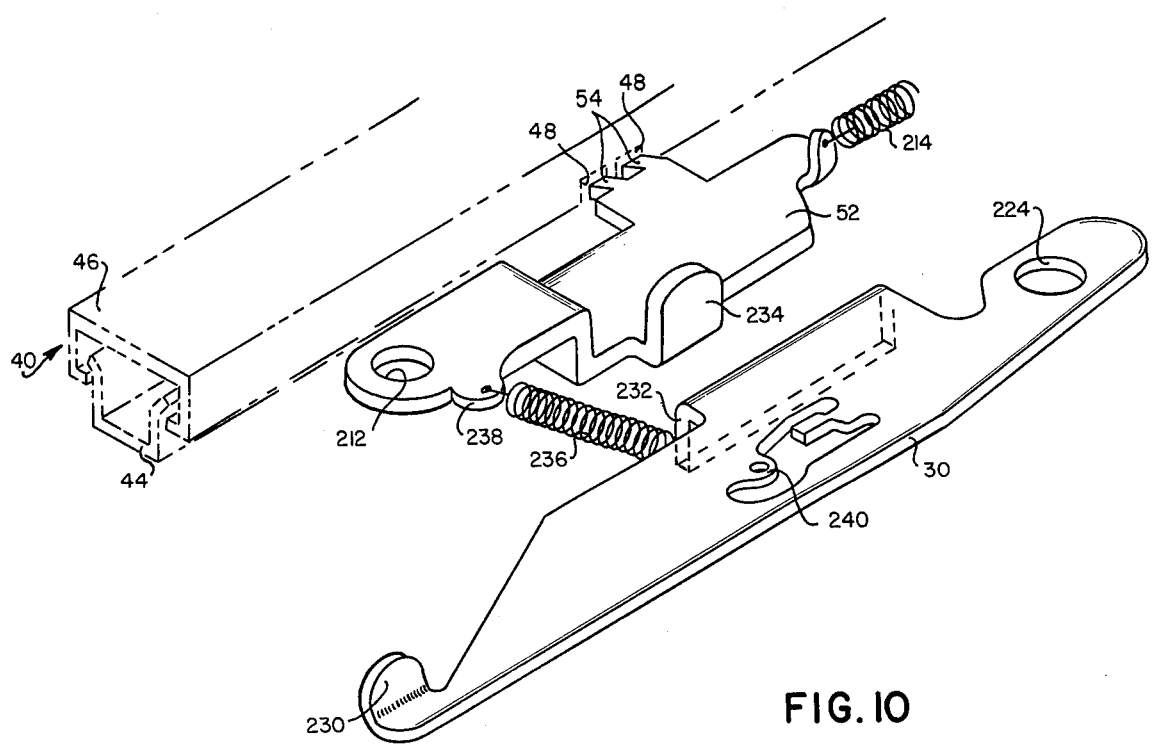
FIG. 10 is a perspective, exploded view of the adjuster latch and lever and associated parts used to adjust the position of the seat on a supporting pair of slidable adjusters.

The details of the arrangement including the adjuster lever 30 and the adjuster latch 52 for adjusting the fore-aft position of the base plate 60 on the slidable adjusters 40 and 42 are shown in FIGS. 9 and 10 as well as in FIG. 2. As shown in FIG. 2 the adjuster latch 52 is pivotally mounted on the underside of the base plate 60 adjacent the slidable adjuster 40 by a screw 204, a bushing 206 and a nut 208. The screw 204 extends downwardly through an aperture 210 in the base plate 60 and through an aperture 212 in the end of the latch 52 where it receives the bushing 206 and the nut 208. The latch 52 is normally pivoted about the screw 204 into a position in which the teeth 54 engage several of the apertures 48 by a latch spring 214. One end of the latch spring 214 is coupled to the end of the latch 52 opposite the aperture 212, and the opposite end of the latch spring 214 is coupled to the base plate 60 adjacent the slidable adjuster 40. With the adjuster latch 52 so positioned, the base plate 60 and the upper hollow housing 46 of the slidable adjuster 40 are locked in place relative to the lower track 44.

Adjustment of the fore-aft position of the base plate 60 requires that the adjuster latch 52 be pivoted outwardly and away from the slidable adjuster 40 so as to remove the teeth 54 from the apertures 48. This is accomplished by manual actuation of the adjuster lever 30. The adjuster lever 30 is pivotally mounted on the underside of the edge of the bearing retainer plate 64 by a screw 220 which extends through an aperture 222 in the edge of the bearing retainer plate 64 and through an aperture 224 in the end of the adjuster lever 30 where it receives a lock washer 226 and a hex nut 228. This allows the lever 30 to pivot about the screw 220 in response to manual actuation of a tab 230 at the opposite end of the lever 30 from the aperture 224. The tab 230 extends from under the seat 10 as shown in FIG. 1 to facilitate access thereto. The lever 30 has a downwardly extending flange 232 at one side thereof which extends over and engages an upwardly extending flange 234 at the side of the latch 52.

Accordingly, pivoting movement of the lever 30 in a direction away from the slidable adjuster 40 by manual actuation of the tab 230 causes the flange 232 to pull the flange 234 and thereby pivot the latch 52 away from the slidable adjuster 40 so as to remove the teeth 54 from the apertures 48. Upon release of the tab 230, the latch 52 rotates under the urging of the spring 214 to position the teeth 54 within selected ones of the apertures 48. This action including the pivoting movement of the lever 30 back to the locked or off position is aided by a lever spring 236 having one end coupled to a tab 238 at the end of the latch 52 adjacent the aperture 212 and an opposite end coupled to a tab 240 at a central region of the lever 30. Because the bearing retainer plate 64 which mounts the lever 30 is capable of undergoing fore-aft motion relative to the base plate 60 which mounts the latch 52, movement can occur between the lever 30 and the latch 52. When this occurs the flange 232 simply slides along the flange 234 and the lever spring 236 flexes as necessary while at the same time holding the lever 30 in the off or locked position. The flange 232 on the lever 30 is longer than the flange 234 on the latch 52 to insure engagement therebetween independent of the fore-aft position of the bearing retainer plate 64 and its included lever 30.

Figure 11:
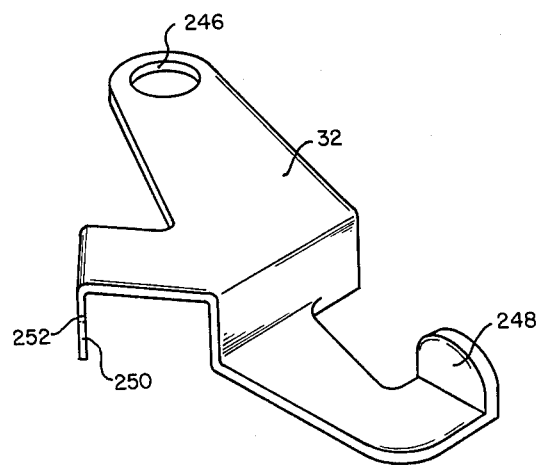
FIG. 11 is a perspective view of the swivel lock lever which may be used to lock out swivel of the seat.
Figure 4:
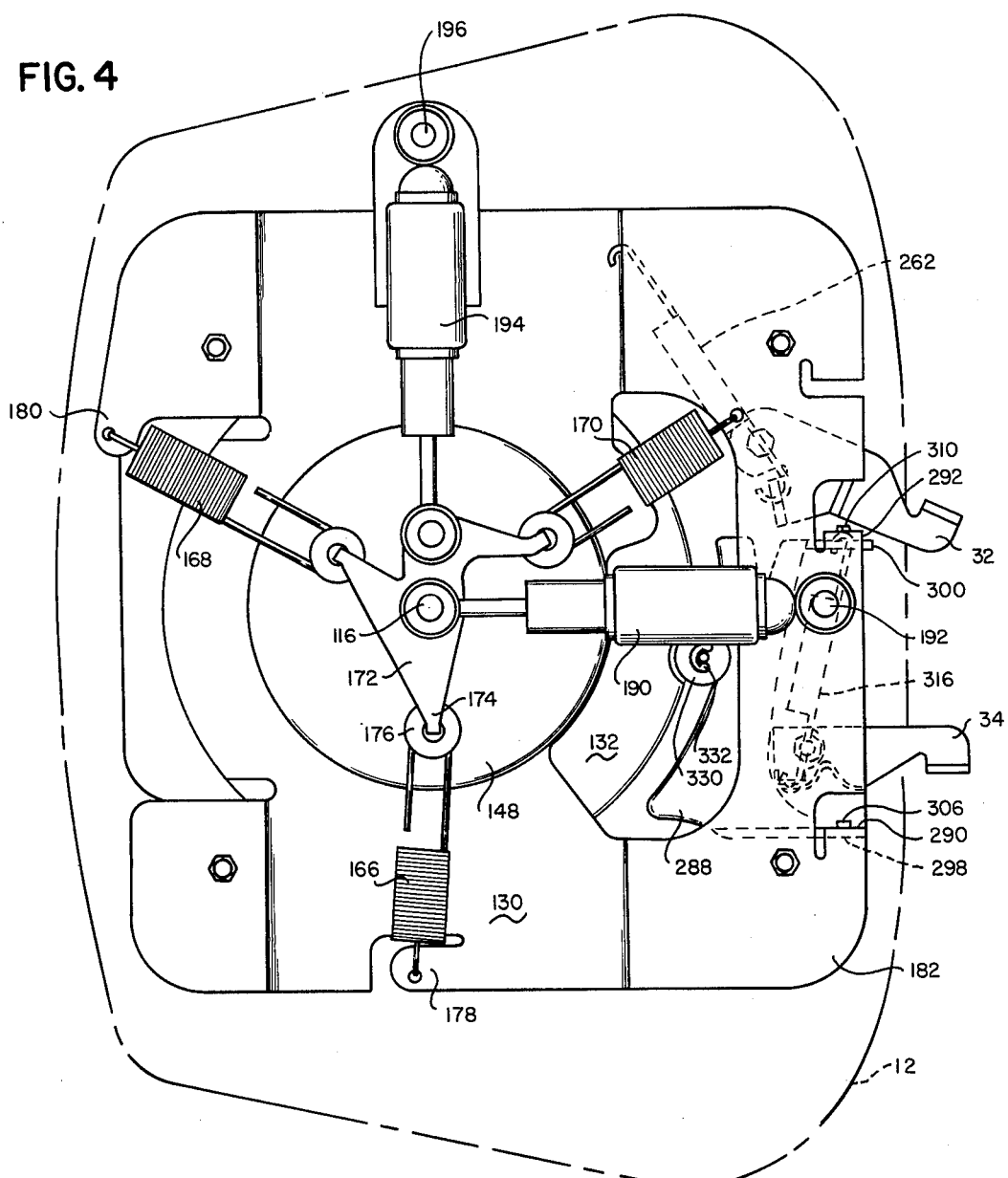
FIG. 4 is a top, plan view of the arrangement of FIG. 2 when assembled and showing the seat cushion in dotted outline.
Figure 8:
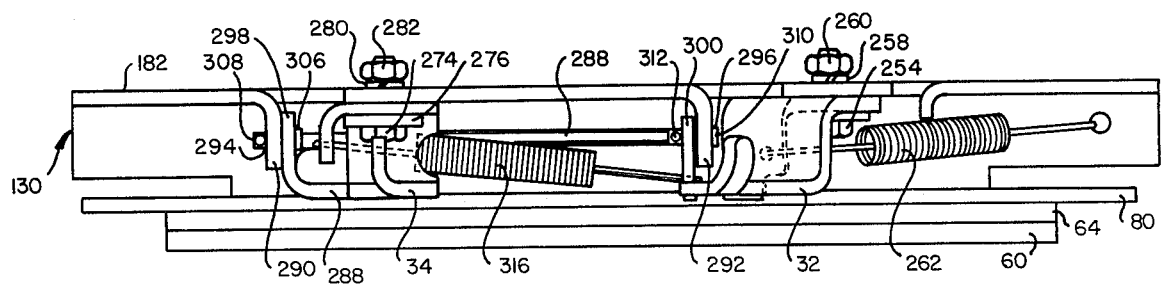
FIG. 8 is a front view of a portion of the arrangement of FIG. 4.
Figure 5:
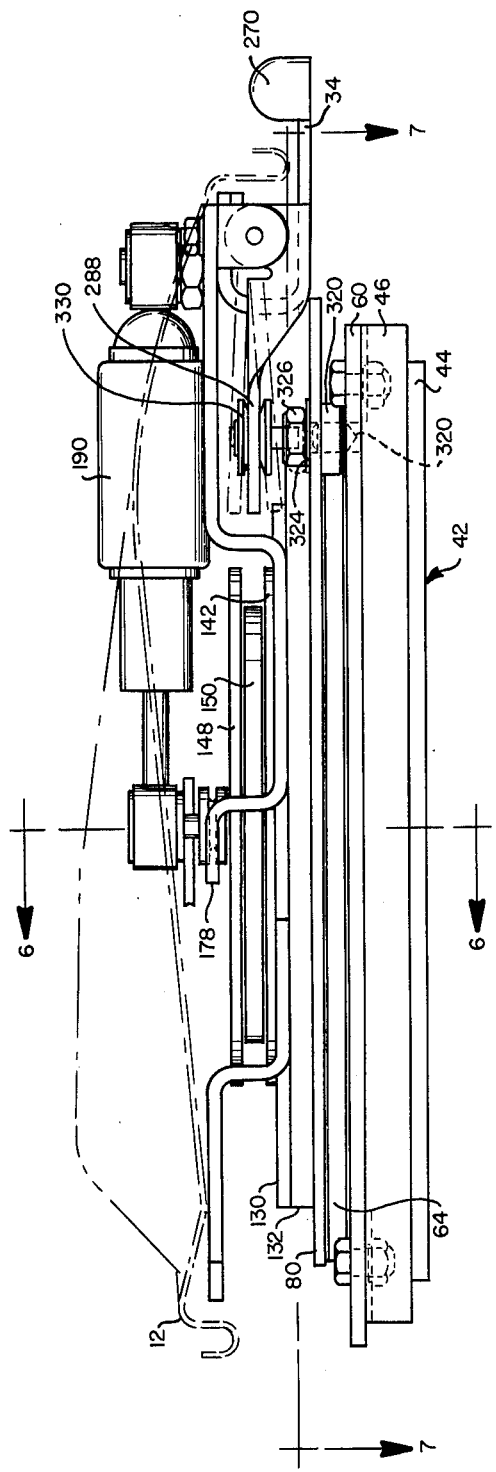
FIG. 5 is a side view of the arrangement of FIG. 4, showing a portion of the seat cushion in dotted outline.
Figure 6:
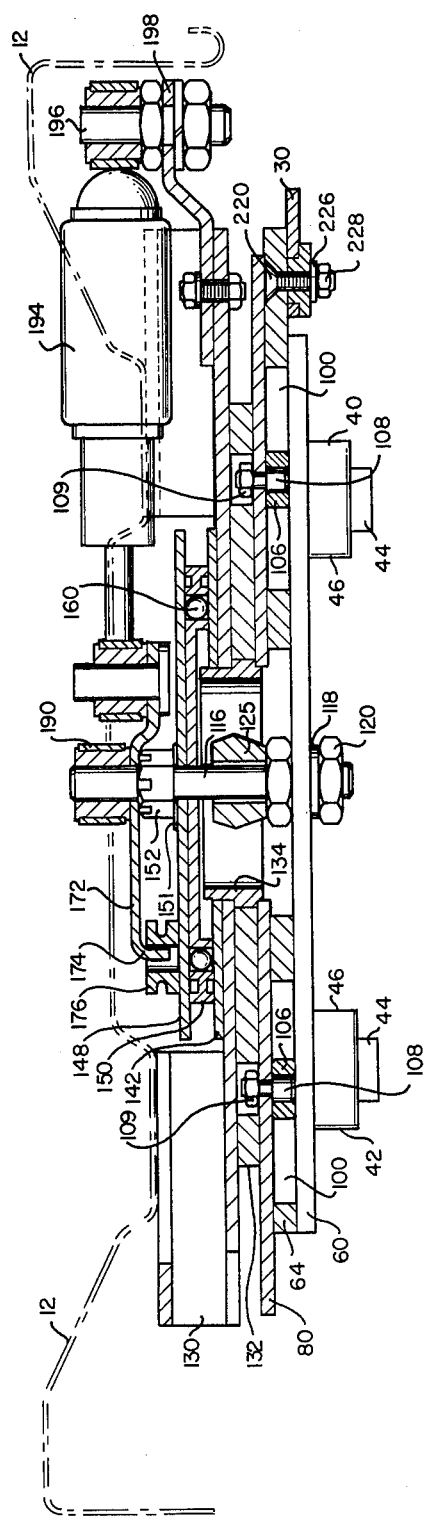
FIG. 6 is a sectional view taken along the line 6—6 of FIG. 5.

The details of the arrangement including the swivel lock lever 32 for locking out rotation of the seat 10 are shown in FIGS. 4, 8 and 11 in addition to FIG. 2. FIG. 11 depicts the details of the swivel lock lever 32 which includes an aperture 246 at one end thereof and a manually actuable tab 248 at the opposite end. One side of the lever 32 contains a downwardly extending flange 250 containing an aperture 252 therein. The tab 248 extends from under the seat 10 to provide manual access thereto as shown in FIG. 1.

The swivel lock lever is pivotally coupled to the underside of the raised platform 182 at the front of the seat mounting plate 130. This is accomplished by a screw 254 which extends upwardly through a bushing and the aperture 246 in the lever 32 and through an aperture 256 in the raised platform 182 where the screw 254 receives a lock washer 258 and a hex nut 260. A spring 262 has one end thereof coupled to the aperture 252 in the flange 250 of the lever 32 and an opposite end coupled to a back part of the raised platform 182.

As shown in FIG. 4 the lever 32 and the spring 262 are arranged so that the spring 262 holds the lever 32 in either of two opposite positions. When the lever 32 is rotated in a counterclockwise direction as viewed in FIG. 4 by manual actuation of the tab 248, the spring 262 contracts and holds the lever 32 in this position. While in this position the flange 250 of the lever 32 is spaced apart from the teeth 126 in the outer edge of the lower bearing plate 80, and the seat is free to rotate. When the lever 32 is rotated in a clockwise direction as viewed in FIG. 4, the spring 262 first expands as the lever moves through an intermediate position and then contracts as the lever reaches an opposite position so as to hold the lever in that opposite position. In the opposite position, the lower extremity of the flange 250 of the lever 32 engages out of the teeth 126 in the lower bearing plate 80 to lock the seat against rotation. The teeth 126 extend along a portion of the outer periphery of the lower bearing plate 80, enabling the seat 10 to be locked in various different angular positions if desired.

Figure 12:
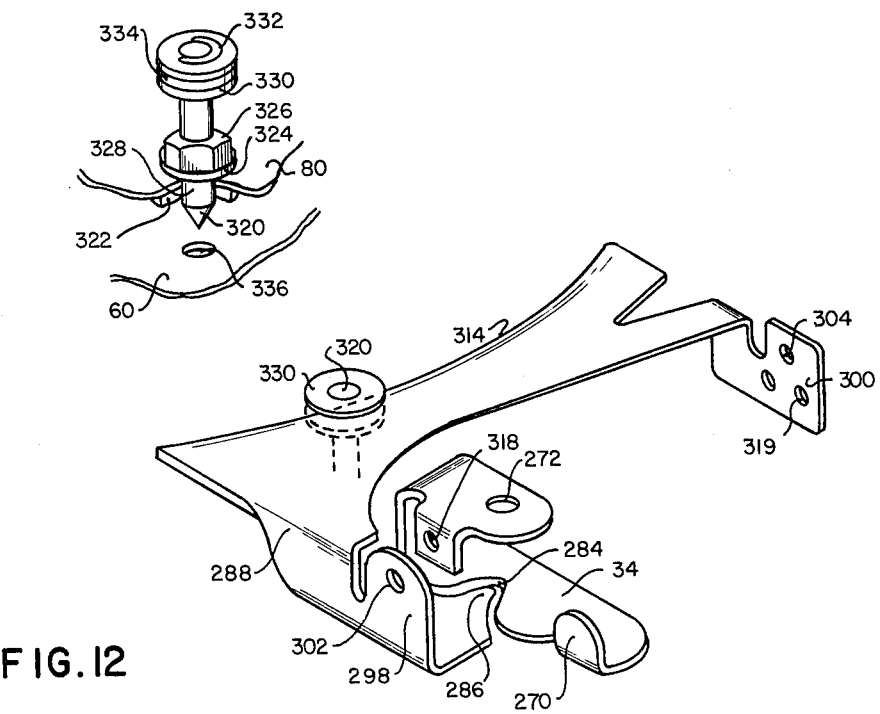
FIG. 12 is a perspective, exploded view of the arrangement which may be used to lock out attenuating movement of the seat.

The details of the arrangement including the attenuator lock lever 34 for locking out attenuating movement of the seat 10 are shown in FIGS. 4, 5, 8 and 12 in addition to FIG. 2. The lever 34 which includes a manually actuable tab 270 at one end thereof curves up and over at the opposite end thereof and terminates in a portion having an aperture 272 therein. The tab 270 protrudes from under the seat 10 to provide manual access thereto as shown in FIG. 1. The lever 34 is pivotally coupled to the underside of the raised platform 182 on the seat mounting plate 130 by a screw 274. The screw 274 extends through a bushing 276, through the aperture 272 in the lever 34, and through an aperture 278 in the raised platform 182 where it receives a lock washer 280 and a hex nut 282. As shown in FIG. 12 the lever 34 has a notch 284 in an intermediate portion thereof which is capable of receiving and engaging a tooth 286 on an attenuator lock plate 288. The lock plate 288 is pivotally coupled to the underside of the raised platform 182 of the seat mounting plate 130. The raised platform 182 has a spaced-apart pair of downwardly extending tabs 290 and 292 at the front edge thereof. The tabs 290 and 292 have apertures 294 and 296 therein respectively. The lock plate 288 has an opposite pair of tabs 298 and 300 which respectively engage the tabs 290 and 292 of the raised platform 182. The tabs 298 and 300 have apertures 302 and 304 therein respectively. A pin 306 extends through the aperture 302 in the tab 298 and the aperture 294 in the tab 290 where it receives a cotter pin 308. A pin 310 extends through the aperture 304 in the tab 300 and the aperture 296 in the tab 292 where it receives a cotter pin 312.

The lock plate 288 pivots about the pins 306 and 310 such that a curved edge 314 at the back thereof is raised and lowered in response to pivoting movement of the plate 288. Pivoting of the lock plate 288 is caused by pivoting movement of the attenuator lock lever 34. As the lever 34 is rotated against the urging of a spring 316 which is coupled between an aperture 318 in the lever 34 and an aperture 319 in the tab 300 of the lock plate 288 and which pulls the lever 34 into one or the other of opposite positions, the notch 284 in the lever 34 engages the tooth 286 and by camming action pivots the lock plate 288 so as to raise and lower the curved edge 314 of the lock plate 288.

A vertically disposed pin 320 is slidably mounted by a pin guide 322 mounted on the underside of the lower bearing plate 80 and a lock washer 324 and jamb nut 326 located on the opposite upper side of the plate 80. The pin 320 extends through an aperture 328 in the plate 80 and is free to slide up and down within the guide 322, the washer 324 and the nut 326. A roller 330 is mounted on the upper end of the pin 320 and is held in place by a retaining ring 332. The roller 330 has a groove 334 in the outer periphery thereof which is adapted to receive the curved edge 314 of the attenuator lock plate 288 when the seat 10 is generally facing in a forward direction so that a portion of the edge 314 is disposed within the groove 334.

When the seat 10 is in the nominal center position attenuating movement may be locked out by rotating the attenuator lock lever 34 so as to pivot the attenuator lock plate 288 in a downward direction. The resulting downward movement of the curved edge 314 at the rear of the plate 288 forces the roller 330 and the included pin 320 downwardly. As the pin 320 moves downwardly it enters an aperture 336 in the front end of the base plate 60. With the pin 320 in this position, the seat assembly 82 is locked through the intermediate assembly 66 to the base assembly 62 so that attenuating movement cannot occur. Attenuating movement may be restored to the seat 10 by rotating the lever 34 so as to pivot the attenuator lock plate 288 upwardly and thereby raise the roller 330 and the included pin 320. As the pin 320 is raised out of the aperture 336 in the base plate 60, the bearing retainer plate 64 and the lower bearing plate 80 are free to move relative to the base plate 60.

Figure 13:
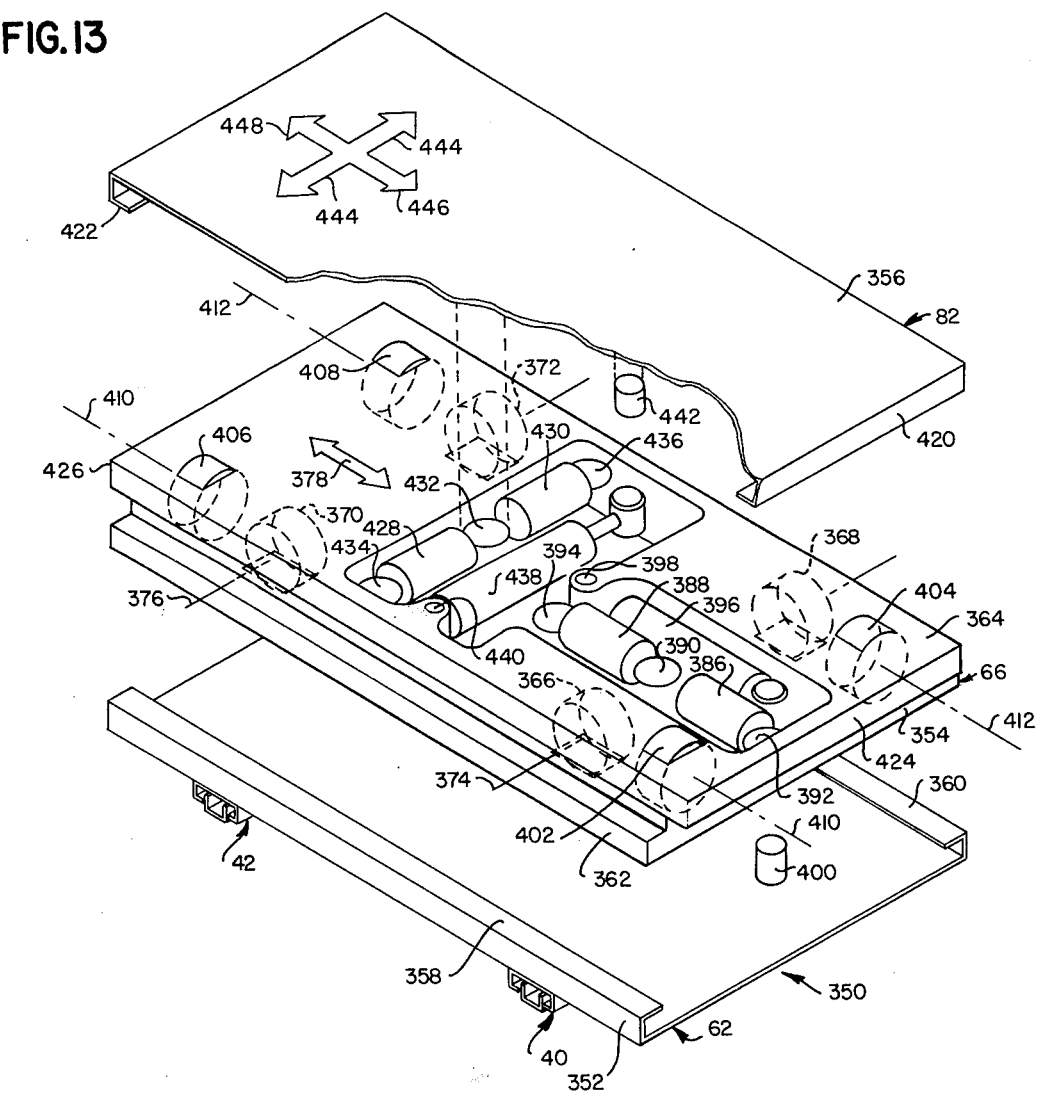
FIG. 13 is a perspective, exploded view of an alternative arrangement of a multi-directional vibration attenuator seat in accordance with the invention.

An alternative embodiment of a multi-directional vibration attenuator seat 350 in accordance with the invention is shown in FIG. 13. The seat 350 includes a base plate 352 comprising the base assembly 62, a roller assembly 354 comprising the intermediate assembly 66 and a seat support plate 356 comprising part of the seat assembly 82. The remainder of the seat assembly 82 which comprises the seat cushion 12, the backrest 14, the armrests 16 and a swivel mechanism therefor has been omitted from FIG. 13 for simplicity of illustration. Any conventional swivel mechanism can be used.

The base plate 352 is mounted of the slidable adjusters 40 and 42. A pair of opposite edges of the base plate 352 extend up and over to form guides 358 and 360. The guides 358 and 360 receive the opposite edges 362 and 364 respectively of the roller assembly 354.

The roller assembly 354 includes a first plurality of rollers in the form of four different rollers 366, 368, 370 and 372 rotatably mounted within the assembly 354 about a first plurality of generally parallel axes. The first plurality of generally parallel axes includes an axis 374 about which the rollers 366 and 368 rotate and an axis 376 about which the rollers 370 and 372 rotate. The rollers 366, 368, 370 and 372 extend beneath the bottom surface of the roller assembly 354 and into contact with the upper surface of the base plate 352. Accordingly, the roller assembly 354 is capable of undergoing lateral movement relative to the base plate 352 in opposite directions along a lateral axis as represented by a double headed arrow 378.

Movement of the roller assembly 354 in the directions shown by the arrow 378 is restrained by a pair of springs 386 and 388. One end of each of the springs 386 and 388 is coupled to a stud 390 which is secured to the base plate 352. The opposite ends of the springs 386 and 388 are coupled to opposite portions 392 and 394 respectively of the roller assembly 354. The springs 386 and 388 lie along a common axis of elongation which is parallel to the arrow 378. Movement of the roller assembly 354 in the directions of the arrow 378 is damped by a shock absorber 396 disposed generally parallel to the springs 386 and 388. One end of the shock absorber 396 is coupled to a stud 398 on the roller assembly 354. The opposite end of the shock absorber 396 is coupled to a stud 400 which is mounted on the base plate 352.

The roller assembly 354 is also provided with a second plurality of rollers which includes rollers 402, 404, 406 and 408 mounted for rotation about a second plurality of generally parallel axes. The second plurality of generally parallel axes include an axis 410 about which the rollers 402 and 406 rotate and an axis 412 about which the rollers 404 and 408 rotate. The rollers 402, 404, 406, and 408 extend above the roller assembly 354 and into contact with the bottom surface of the seat support plate 356, enabling the plate 356 to move along an axis relative to the roller assembly 354 which is perpendicular to the arrow 378 and which is in the fore-aft direction. At the same time lateral movement of the seat support plate 356 relative to the roller assembly 354 is prevented by the opposite edges of the seat support plate 356 which are curved downwardly and then inwardly to form a pair of opposite guides 420 and 422. The guide 420 receives an edge 424 of the roller assembly 354 therein. The guide 422 receives an edge 426 of the roller assembly 354 therein.

Movement of the seat support plate 356 relative to the roller assembly 354 is restrained by a pair of springs 428 and 430 which are mounted along a common axis extending in the fore-aft direction and which is perpendicular to the common axis of the springs 386 and 388. One end of each of the springs 428 and 430 is coupled to a stud 432 mounted on the underside of the seat support plate 356. The opposite ends of the springs 428 and 430 are coupled to opposite portions 434 and 436 respectively of the roller assembly 354. Movement of the seat support plate 356 relative to the roller assembly 354 is damped by a shock absorber 438 disposed along an axis generally parallel to the common axis of the springs 428 and 430. The shock absorber 438 has one end thereof coupled to a stud 440 on the roller assembly 354 and an opposite end coupled to a stud 442 mounted on the underside of the seat support plate 356.

As vibrations and other motions are exerted on the seat mounted on the seat support plate 356, the plate 356 is capable of undergoing movement in a fore-aft direction relative to the roller assembly 354 as provided by the rollers 402, 404, 406 and 408 under the restraint of the springs 428 and 430 and the shock absorber 438. At the same time the roller assembly 354 is capable of undergoing lateral movement relative to the base plate 352 via the rollers 366, 368, 370 and 372 under the control of the springs 386 and 388 and the shock absorber 396. This enables the seat to move in any direction within a generally horizontal plane. The permissible fore-aft movement of the seat support plate 356 relative to the roller assembly 354 is represented by a double ended arrow 444. At the same time the seat support plate 356 is capable of moving laterally relative to the base plate 352 because of the permissible lateral movement of the roller assembly 354 relative to the base plate 352 as represented by arrows 446 and 448 which correspond to the arrow 378. Accordingly the seat support plate 356 is capable of undergoing movement in virtually any direction within a generally horizontal plane.

The preferred embodiment of FIGS. 1–12 and the alternative embodiment of FIG. 13 are but two examples of multi-directional vibration attenuator seats in accordance with the invention. It will be apparent to those skilled in the art that still other arrangements are possible in accordance with the broader concepts of the invention. For example, the opposing springs and shock absorbers can be replaced by a pneumatic system in which air or fluid filled bladders function as the springs and shock absorbers. Such an arrangement can be designed in a relatively simple circular configuration in which a first circular part nominally concentric with a second circular part is movable in any direction relative to the second circular part within a generally horizontal plane. The first part is normally held in and movement out of the nominal position is restrained by a first plurality of air or fluid filled bladders which are disposed in a spaced-apart circular configuration between the first and second circular parts and which act as springs. The bladders may be coupled to a common air or fluid source. A second plurality of air of fluid filled bladders interspersed with the first plurality of bladders acts as shock absorbers.

Thus, while the invention has been particularly shown and described with reference to preferred embodiments thereof, it will be understood by those skilled in the art that the foregoing and other changes in form and details may be made therein without departing from the spirit and scope of the invention.

What is claimed is:

1. A multi-directional vibration attentuator seat comprising:
   a base assembly;
   an intermediate assembly mounted on the base assembly;
   a seat assembly mounted on the intermediate assembly;
   means for permitting movement of the intermediate assembly relative to the base assembly exclusively along a first axis;
   means for permitting movement of the seat assembly relative to the intermediate assembly exclusively along a second axis extending in a different direction from the first axis; and
   means for resiliently biasing the seat assembly into a nominal position relative to the first axis and the second axis.

2. A multi-directional vibration attenuator seat assembly comprising:
   a base plate;
   an intermediate plate disposed on the base plate;
   a lower plate disposed on the intermediate plate;
   means for allowing sliding movement of the intermediate plate relative to the base plate and relative to the lower plate;
   means for permitting movement of the intermediate plate relative to the base plate along a first axis;
   means for permitting movement of the lower plate relative to the intermediate plate along a second axis generally perpendicular to the first axis;
   a seat mounting plate disposed above the lower plate; and
   means for permitting rotation of the seat mounting plate relative to the lower plate.

3. A multi-directional vibration attenuator seat comprising:
   a base assembly;
   an intermediate assembly mounted on the base assembly and having a first plurality of slots therein extending in a first direction and a second plurality of slots therein extending in a second direction different from the first direction;
   a seat assembly mounted on the intermediate assembly,
   means for permitting limited movement of the intermediate assembly relative to the base assembly in the first direction and including a first plurality of guide elements mounted on the base assembly and residing within the first plurality of slots in the intermediate assembly; and
   means for permitting limited movement of the seat assembly relative to the intermediate assembly in the second direction and including a second plurality of guide elements mounted on the seat assembly and residing within the second plurality of slots in the intermediate assembly.

4. The invention set forth in claim 3, wherein the first direction lies along a first axis within a plane, the second direction lies along a second axis within the plane, and the second axis is generally perpendicular to the first axis.

5. The invention set forth in claim 3, wherein the seat assembly includes an upper assembly mounted on the intermediate assembly and a seat rotatably mounted on the upper assembly.

6. The invention set forth in claim 3, further including means for selectively locking the base assembly, the intermediate assembly and the seat assembly together to prevent relative movement.

7. The invention set forth in claim 3, further including means coupled between the seat assembly and the base assembly for damping movement of the seat assembly relative to the base assembly and resilient means coupled between the seat assembly and the base assembly for providing a controlled resistance to movement of the seat assembly relative to the base assembly.

8. A multi-directional vibration attenuator seat assembly comprising:
   a base plate;
   a bearing retainer plate disposed on the base plate;
   a lower bearing plate disposed on the bearing retainer plate;
   a plurality of bearings mounted within the bearing retainer plate and contacting the base plate and the lower bearing plate to permit sliding movement thereof relative to the bearing retainer plate;

means for permitting movement of the bearing retainer plate relative to the base plate along a first axis;

means for permitting movement of the lower bearing plate relative to the bearing retainer plate along a second axis generally perpendicular to the first axis;

a seat mounting plate disposed above the lower bearing plate; and means for permitting rotation of the seat mounting plate relative to the lower bearing plate.

9. The invention set forth in claim 8, wherein the means for permitting movement of the bearing retainer plate relative to the base plate includes a first plurality of elongated slots in the bearing retainer plate and a first plurality of rollers mounted on the base plate and extending into the first plurality of elongated slots and the means for permitting movement of the lower bearing plate relative to the bearing retainer plate includes a second plurality of elongated slots and a second plurality of rollers mounted on the lower bearing plate and extending into the second plurality of elongated slots.

10. The invention set forth in claim 8, wherein the lower bearing plate and the seat mounting plate each have a central aperture therein and the means for permitting rotation of the seat mounting plate relative to the lower bearing plate includes a collar mounted on the lower bearing plate at the central aperture thereof and extending through the central aperture in the seat mounting plate, a swivel disk disposed between the lower bearing plate and the seat mounting plate and having a central aperture therein through which the collar extends, a lower bearing disk disposed on the seat mounting plate and having a central aperture therein through which the collar extends, a bearing retainer disk disposed on the lower bearing disk and having a plurality of bearings mounted therein and in contact with the lower bearing disk and an upper bearing disk disposed on the bearing retainer disk and in contact with the plurality of bearings.

11. The invention set forth in claim 8, further including a stud mounted on and extending generally vertically upwardly from the base plate, a plurality of springs coupled between the stud and different portions of the seat mounting plate and a plurality of shock absorbers coupled between the stud and different portions of the seat mounting plate.

12. The invention set forth in claim 11, further including a spider member mounted on the stud, and wherein the plurality of springs comprises three springs generally equidistantly spaced about the stud and each having a first end coupled to the spider member and an opposite second end coupled to the seat mounting plate and the plurality of shock absorbers comprises a pair of shock absorbers disposed generally perpendicular to each other, one of the shock absorbers having a first end coupled to the spider member, the other one of the shock absorbers having a first end coupled to the stud, and both of the pair of shock absorbers having an opposite second end coupled to the seat mounting plate.

13. The invention set forth in claim 8, further including a pair of slidable adjusters mounted on an underside of the base plate opposite the bearing retainer plate and means coupled to the base plate for locking the base plate in a selected position relative to one of the pair of slidable adjusters.

14. The invention set forth in claim 13, wherein the means coupled to the base plate includes an adjuster latch pivotally coupled to the base plate and having a portion thereof adapted to engage said one of the pair of slidable adjusters and an adjuster lever pivotally coupled to the bearing retainer plate and engaging the adjuster latch.

15. The invention set forth in claim 14, wherein the means coupled to the base plate further includes means for normally biasing the adjuster latch into engagement with said one of the pair of slidable adjusters and means for normally biasing the adjuster lever in a direction to allow the adjuster latch to engage said one of the pair of slidable adjusters.

16. The invention set forth in claim 8, further including means coupled to the seat mounting plate for locking the seat mounting plate to the lower bearing plate to prevent rotation of the seat mounting plate.

17. The invention set forth in claim 16, wherein the lower bearing plate has a plurality of teeth in the outer periphery thereof and the means coupled to the seat mounting plate includes a swivel lock lever pivotally coupled to the seat mounting plate and having a portion thereof capable of engaging one of the plurality of teeth in the outer periphery of the lower bearing plate to prevent rotation of the seat mounting plate and means for normally biasing the swivel lock lever either away from or toward the lower bearing plate.

18. The invention set forth in claim 8, further including means for selectively locking the lower bearing plate, the bearing retainer plate and the base plate together to prevent relative movement therebetween.

19. The invention set forth in claim 18, wherein the means for selectively locking includes an aperture in the base plate, a pin mounted on the lower bearing plate and slidably movable vertically to engage the aperture in the base plate and lock the lower bearing plate and the base plate together when the pin is lowered, and means for selectively raising and lowering the pin.

20. The invention set forth in claim 19, wherein the means for selectively raising and lowering the pin includes a roller mounted on the upper end of the pin, an attenuator lock plate pivotally coupled to the underside of the seat mounting plate and having a curved edge engaging the roller when the seat mounting plate is within a selected angular range relative to the lower bearing plate and an attenuator lock lever pivotally coupled to the underside of the seat mounting plate and engagable with the attenuator lock plate to pivot the attenuator lock plate with rotation of the attenuator lock lever.

21. A multi-directional vibration attenuator seat assembly comprising:
 a base assembly;
 an intermediate assembly disposed above the base assembly;
 a first plurality of rollers rotatably mounted in the intermediate assembly about a first plurality of generally parallel axes and extending into contact with the base assembly;
 a seat assembly disposed above the intermediate assembly;
 a second plurality of rollers rotatably mounted in the intermediate assembly about a second plurality of generally parallel axes generally perpendicular to the first plurality of axes, the second plurality of rollers extending into contact with the seat assembly; and
 means for tending to maintain the seat assembly in a nominal position relative to the base assembly.

22. The invention set forth in claim 21, wherein the means for tending to maintain includes a first shock absorber coupled between the intermediate assembly and the base assembly and extending in a direction generally parallel to the second plurality of generally parallel axes, a first pair of springs coupled between a common location on the base assembly and opposite portions of the intermediate assembly and extending along an axis generally parallel to the second plurality of generally parallel axes, a second shock absorber coupled between the intermediate assembly and the seat assembly and extending in a direction generally parallel to the first plurality of generally parallel axes, and a second pair of springs coupled between a common location on the seat assembly and opposite portions of the intermediate assembly and extending along an axis generally parallel to the first plurality of generally parallel axes.

23. The invention set forth in claim 21, wherein the seat assembly includes a rotatably mounted seat.

* * * * *

UNITED STATES PATENT AND TRADEMARK OFFICE
CERTIFICATE OF CORRECTION

PATENT NO. : 4,477,050
DATED : October 16, 1984
INVENTOR(S) : James E. Thompson et al It is certified that error appears in the above-identified patent and that said Letters Patent are hereby corrected as shown below:

Column 1, line 55, "ofNystrom" should read --of Nystrom--. Column 2, line 6, "inventionby" should read --invention by--; line 46, "inermediate" should read --intermediate--. Column 7, line 37, after "mounted", "to" should read --on--. Column 8, line 12, after "during", "each" should read --such--. Column 10, line 36, after "engages", "out" should read --one--. Column 11, line 62, after "mounted", "of" should read --on--.

Signed and Sealed this

Eighteenth Day of June 1985

[SEAL]

Attest:

DONALD J. QUIGG

*Attesting Officer*   *Acting Commissioner of Patents and Trademarks*